No. 666,756. Patented Jan. 29, 1901.
E. A. HULETT & J. HOLMES.
LID FOR COOKING UTENSILS.
(Application filed June 11, 1900.)
(No Model.)

E. A. Hulett and
John Holmes
Inventors

Witnesses
Frank G. Campbell by C. A. Snow & Co.
Attorneys

UNITED STATES PATENT OFFICE.

EDWARD A. HULETT AND JOHN HOLMES, OF ARMADA, MICHIGAN.

LID FOR COOKING UTENSILS.

SPECIFICATION forming part of Letters Patent No. 666,756, dated January 29, 1901.

Application filed June 11, 1900. Serial No. 19,912. (No model.)

*To all whom it may concern:*

Be it known that we, EDWARD A. HULETT and JOHN HOLMES, citizens of the United States, residing at Armada, in the county of Macomb and State of Michigan, have invented a new and useful Lid for Cooking Utensils, of which the following is a specification.

This invention relates to lids or covers for cooking utensils, and has for one object to provide an improved hinged lid which is especially designed for application to frying-pans and arranged to be conveniently raised and lowered by the hand which grasps the handle of the pan. It is furthermore designed to provide a detachable device of this character, so that a single lid may be applied to different utensils without altering or changing the latter, and to provide for conveniently holding the lid in its closed position, so that the contents of the utensil may be effectively drained without removing the former from the latter.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

Figure 1:
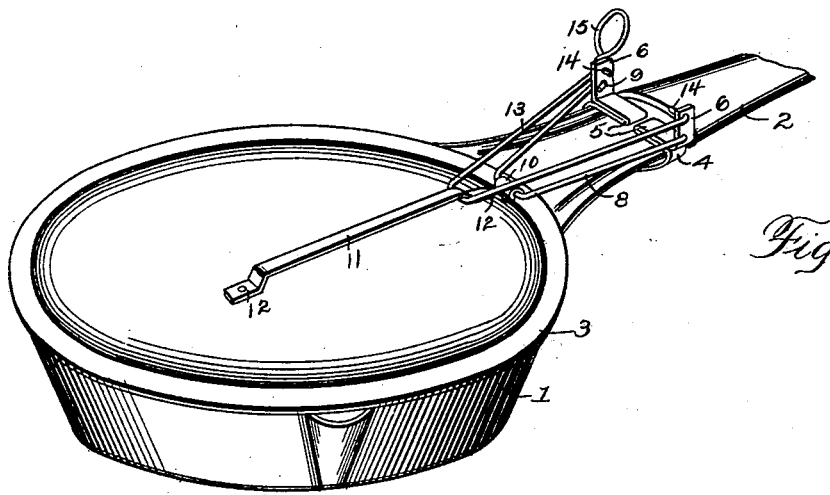
Figure 2:
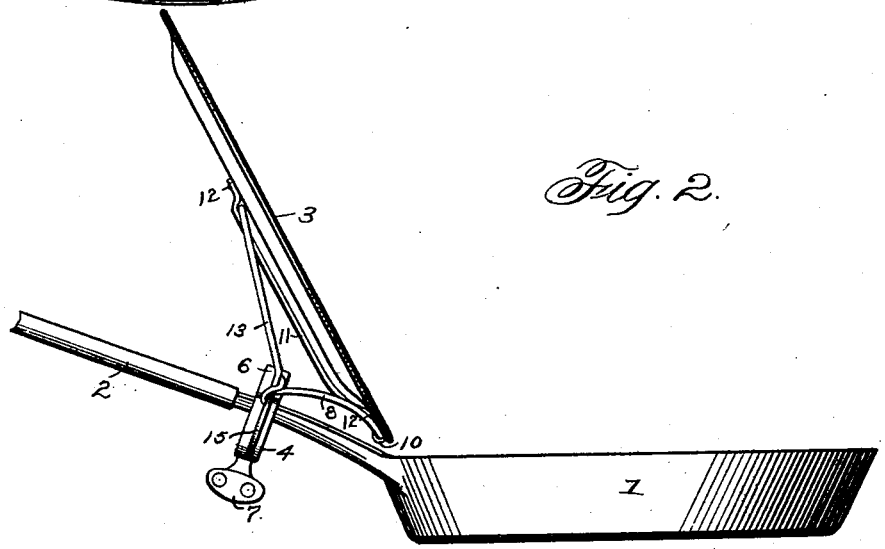
Figure 3:
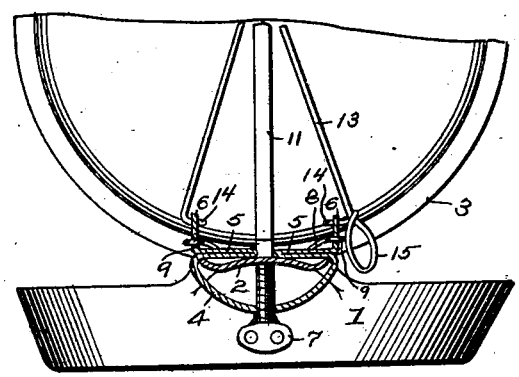

In the drawings, Figure 1 is a perspective view of a frying-pan having the improved lid applied thereto and in closed position. Fig. 2 is a side elevation with the lid thrown upwardly to expose the interior of the pan. Fig. 3 is a transverse sectional view taken through the connection between the lid and the pan, the former being opened.

Corresponding parts are designated by like characters of reference in all of the figures of the drawings.

Referring to the accompanying drawings, 1 designates an ordinary frying-pan, having the usual handle 2 and provided with an ordinary tin cover or lid 3. These parts may have any preferred form and have been shown in the drawings to more adequately illustrate the application of the present device.

In carrying out the present invention there is provided a yoke-shaped attaching-bracket 4, which is formed from a metal strap, the opposite sides of which are bent inwardly and folded upon themselves, so as to form inwardly-directed flanges 5, while the opposite extremities of the strap are bent upwardly to form the opposite ears 6. As best illustrated in Fig. 3 of the drawings, the opposite flanges 5 are directed across the concaved side of the bracket, and the bowed portion thereof carries a binding-screw 7, which extends tranversely inward through the body of the bracket and toward the flanges. A substantially U-shaped link 8 has its opposite ends bent laterally inward to form fingers or hooks 9, which are passed inwardly through suitable perforations in the respective upstanding ears 6, adjacent to the lower ends thereof. The opposite transverse end of the link is pivotally connected to the outer side of the cover or lid by means of a sleeve or eye 10, which is soldered or otherwise connected to the lid at or adjacent to the peripheral edge thereof and loosely embraces the transverse end of the link.

Extending radially inward from a point adjacent to the sleeve or eye 10 and in alinement therewith is a loop 11, formed by a metal strap or rod having each end provided with a foot 12, which is connected to the outer side of the lid, so as to space the strap outwardly therefrom and also to form stop-shoulders at opposite ends of the loop.

Slidably embracing the guide rod or strap 11 is the transverse end of a substantially U-shaped link 13, which is formed of wire and has its opposite ends bent laterally inward, so as to form opposite pivot-pins 14, which pass inwardly through suitable perforations in the ears 6, thereby forming a hinged connection between the outer end of the link and the handle of the frying-pan. One side of the link 13 is longer than the other, and adjacent to the respective pivot-pin said side is bent or twisted into a loop-shaped finger-piece 15, which normally has an upwardly and outwardly inclined position in rear of the hinged connection of the link with the bracket.

In the application of the device the attaching-bracket is slipped longitudinally upon the handle of a cooking utensil, and from the outer end thereof, until the lid or cover fits properly upon the pan to cover the same, after which the binding-screw is set inwardly to firmly connect the bracket to the handle. To open the lid, it is merely necessary to press downwardly upon the finger-piece 15, whereby the forward free end of the link 13 is elevated, and by reason of its slidable connection with the lid the latter is carried upwardly upon its hinged connection with the fixed link 8 into the position shown in Fig. 2. Thus the lid may be conveniently opened, and by pressing forwardly upon the finger-piece the lid may be held closed, so as to drain the pan without removing the contents thereof. Also by means of the set-screw the device may be applied to different pans or other utensils.

What is claimed is—

1. The combination with a cooking utensil having a rigid substantially radial handle, and a lid hinged at or adjacent to the handle, of an operating-link hingedly supported upon the handle, and also having a slidable and pivotal connection with the lid, and a rocking finger-piece connected to the link and arranged for operation by the hand which grasps the handle.

2. An attachment for cooking utensils, comprising an attaching-bracket for application to the handle of the utensil, a lid, a link hingedly connecting the lid to the bracket, a second link arranged above the first-mentioned link, hingedly connected to the bracket, and also having a radially-slidable and pivotal connection with the lid, and a rocking finger-piece connected to the second link and arranged externally at one side of the bracket.

3. An attachment for cooking utensils, comprising an attaching-bracket, a lid or cover hinged thereto, and provided upon its outer side with a radial guide rod or strap, which is spaced outwardly from the lid, a substantially U-shaped link having its closed end slidably and pivotally embracing the guide strap or rod, and its opposite end being hingedly connected to the bracket, and a rocking finger-piece connected to the link and arranged at one side of the bracket.

4. An attachment for cooking utensils, comprising an attaching-bracket, having opposite bearing-ears provided with corresponding perforations, a lid or cover hinged to the bracket, and a substantially U-shaped link formed of wire, the closed end of the link having a slidable and pivotal connection with the lid, and the opposite ends of the wire being bent into transverse pivots, which are pivotally received within the respective perforations of the bearing-ears, and a finger-piece connected to the link and arranged at one side of the bracket.

5. An attachment for cooking utensils, comprising an attaching-bracket, having a pair of opposite upstanding bearing-ears, provided with pairs of corresponding perforations, a lid or cover, a substantially U-shaped link formed of wire, the opposite ends of the latter being hooked into corresponding perforations in the ears, a sleeve or eye connected to the outer side of the lid and pivotally embracing the closed end of the link, a second substantially U-shaped wire link, having the opposite ends of the wire bent into transverse pivot-pins, which are pivotally received within corresponding perforations in the bearing-ears, one side of the link being twisted into a finger-piece, and a guide rod or strap, having opposite feet connected to the outer side of the lid, and the closed end of the second link slidably embracing the guide rod or strap.

6. An attachment for cooking utensils, comprising a yoke-shaped attaching-bracket, formed from a single metal strap, which is bowed intermediate of its ends, the opposite sides thereof being bent inwardly across the concaved side of the bracket to form opposite flanges, and the opposite ends of the strap being bent into upstanding bearing-ears, a set-screw carried by the bowed portion of the bracket and extending inwardly toward the flanges, a lid or cover hingedly connected to the ears, and an operating-link hinged to the ears and slidably connected to the lid, and a finger-piece for the link.

In testimony that we claim the foregoing as our own we have hereto affixed our signatures in the presence of two witnesses.

EDWARD A. HULETT.
JOHN HOLMES.

Witnesses:
E. D. LATHROP,
FRANK E. LATHROP.